United States Patent
Ying et al.

(10) Patent No.: US 7,214,288 B2
(45) Date of Patent: May 8, 2007

(54) FABRICATION METHOD OF TEXTILE LAMINATE

(76) Inventors: Cheng-Wu Ying, No.8, Nanyuan 2nd Rd., Jhongli City, Taoyuan County 320 (TW); Chi-Heng Lee, No.8, Nanyuan 2nd Rd., Jhongli City, Taoyuan County 320 (TW)

( * ) Notice: Subject to any disclaimer, the term of this patent is extended or adjusted under 35 U.S.C. 154(b) by 216 days.

(21) Appl. No.: 10/932,007

(22) Filed: Sep. 2, 2004

(65) Prior Publication Data

US 2005/0048860 A1    Mar. 3, 2005

(30) Foreign Application Priority Data

Sep. 2, 2003    (TW) .............................. 92215858 U

(51) Int. Cl.
B32B 5/22    (2006.01)
B32B 5/26    (2006.01)
B32B 5/30    (2006.01)
B32B 31/12    (2006.01)

(52) U.S. Cl. ..................... 156/283; 427/180; 427/208

(58) Field of Classification Search ..................... None
See application file for complete search history.

(56) References Cited

U.S. PATENT DOCUMENTS

| | | | |
|---|---|---|---|
| 4,194,041 A | 3/1980 | Gore et al. | |
| 4,859,266 A * | 8/1989 | Akasaki et al. | 156/273.1 |
| 5,408,012 A | 4/1995 | Barringer, Jr. | |
| 5,560,974 A * | 10/1996 | Langley | 428/198 |
| 5,599,610 A * | 2/1997 | Levy | 442/261 |
| 5,660,918 A | 8/1997 | Dutta | |
| 5,928,582 A | 7/1999 | Kenigsberg | |
| 6,228,477 B1 * | 5/2001 | Klare et al. | 428/315.5 |
| 6,436,528 B1 * | 8/2002 | Kulper et al. | 428/343 |

* cited by examiner

Primary Examiner—Sam Chuan Yao
(74) Attorney, Agent, or Firm—Birch Stewart Kolasch & Birch, LLP

(57) ABSTRACT

A textile laminate includes a hydrophobic membrane, an inner fabric layer and an outer fabric layer sandwiching the hydrophobic membrane. The hydrophobic membrane has a plurality of tangled polymer fibers, a plurality of pores among the polymer fibers, and a plurality of adhesive powder attached on the polymer fibers on the top and bottom surfaces. The grain size of each adhesive powders is small enough to remain the pores without obstructing permeability. The pores in the PTFE film are water vapor permeable and liquid water impermeable.

8 Claims, 3 Drawing Sheets

FABRICATION METHOD OF TEXTILE LAMINATE

This Nonprovisional application claims priority under 35 U.S.C. § 119(a) on Patent Application No(s). 92215858 filed in Taiwan, Republic of China on Sep. 2, 2003, the entire contents of which are hereby incorporated by reference.

BACKGROUND

The present invention relates to a textile laminate and a method of fabricating the same, and more particularly, to a waterproof and breathable textile laminate and fabrication method thereof.

A wide variety of air and water vapor permeable materials have been developed for different purposes. For example, these materials can be used in filtration, separation, and apparel. U.S. Pat. No. 5,928,582, for example, discloses a method of forming a microporous membrane that utilizes an ultraviolet irradiation process to form microsphereulites, followed by a thermally-induced phase separation, yielding microporous membranes that have improved flow and mechanical properties. In U.S. Pat. No. 4,194,041, Gore et al. disclose a waterproof laminate for use in constructing sport apparel having air and water vapor permeability with liquid water resist properties.

Breathable waterproof laminates are particularly advantageous in traditional waterproof textile fabric applications, such as garments. A garment formed of conventional waterproof textile fabric can prevent environmental water, such as rain, from entering the garment, but often tends to be uncomfortable to the wearer, as moisture, such as perspiration, cannot evaporate through the garment. The moisture generally remains trapped in the garment.

Continuous development of the waterproof material has greatly improved breathability of the waterproof garments. Breathable waterproof material is a microporous film comprising a plurality of pores with a size about 1/20000 of liquid water droplets and 700 times that of water vapor. Thus, breathable waterproof material can prevent water from penetration while allowing air and water vapor to escape.

Typically, the waterproof textile laminate for a garment includes a plurality of layers for various functions, such as a fabric layer with thermal regulative property. Accordingly, adhesive agents are required during the manufacturing process to combine these multiple layers. In order to avoid delamination, the adhesive agent must be coated over a majority of each layer. Most adhesive agents, however, are hydrophobic and have very low water permeability, leading to significant deterioration of the water vapor permeability of the textile laminate as the water vapor cannot pass through the adhesive agents. In other words, the breathable ability of a garment is still limited. For example, when massive perspiration is generated due to heavy sport or a high temperature, the perspiration remains on a wearer's body until the perspiration evaporated through the breathable textile laminate gradually. This evaporation process typically takes long time and makes the wearer feels wet and uncomfortable.

In U.S. Pat. No. 5,660,918, Dutta et al. disclose a grid pattern of an adhesive layer for bonding a fabric layer and a hydrophilic layer. The improvement of water permeability, however, is very limited. Thus, a new waterproof textile laminate with high water vapor permeability is desirable.

SUMMARY

Embodiments of the invention provide a waterproof textile laminate and a method of fabricating the same to solve the aforementioned problems.

Accordingly, a textile laminate comprising a hydrophobic membrane, an inner fabric layer, and an outer fabric layer is provided. The hydrophobic membrane has a plurality of tangled polymer fibers, a plurality of pores among the polymer fibers, and a plurality of adhesive powders attached on the polymer fibers on the top surface and the bottom surface for bonding the outer fabric layer and the inner fabric layer to the top surface and the bottom surface of the hydrophobic membrane. The grain size of each adhesive powder is small enough to remain the pores, but leave the pores unobstructed. The pores in the PTFE film are large enough to allow permeation of while blocking liquid water.

In accordance with an embodiment of the fabrication method of the invention, a hydrophobic membrane with a top surface and a bottom surface is first provided. The hydrophobic membrane has a plurality of tangled polymer fibers and a plurality of water impermeable pores among the polymer fibers. A plurality of adhesive powders are then applied to the polymer fibers on the top surface and the bottom surface uniformly utilizing static to spread the adhesive powders. A grain size of each adhesive powder is small enough to cling to the polymer fibers without obstructing the permeability of the hydrophobic membrane. Thereafter, an outer fabric layer and an inner fabric layer sandwich the hydrophobic membrane, secured by the adhesive powders.

Further scope of the applicability of the present invention will become apparent from the detailed description given hereinafter. However, it should he understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
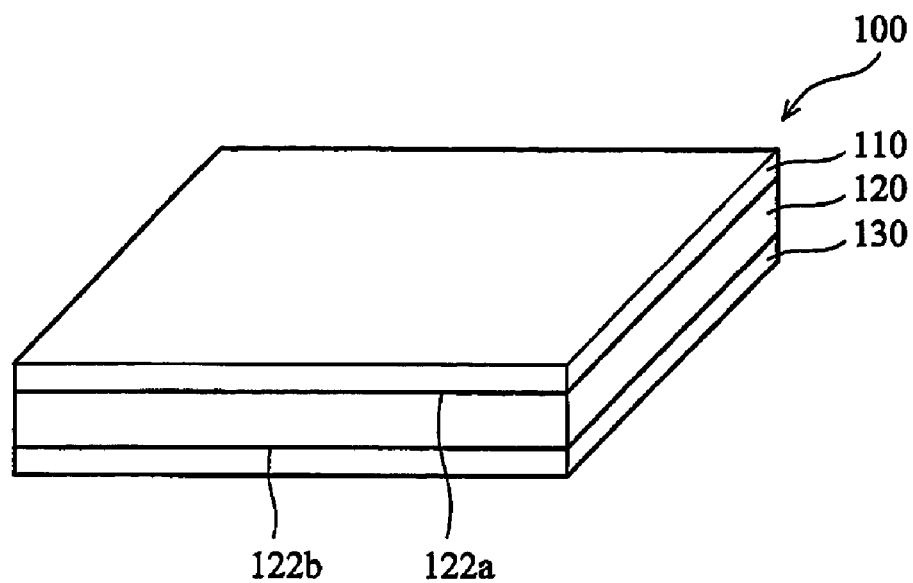
FIG. 1 is a schematic diagram of a textile laminate according to an embodiment of the invention.

FIG. 1 is a schematic diagram of a textile laminate 100 according to an embodiment of the invention. As shown in FIG. 1, the textile laminate 100 comprises an outer fabric layer 110, a hydrophobic membrane 120, and an inner fabric layer 130 stacked in sequence.

In this embodiment of the invention, the outer fabric layer 110 can comprise cloth materials capable of supporting and enhancing the strength of the textile laminate 100, such as synthetic or natural fibers or blends thereof. The outer fabric 110 can comprise windproof or thermally insolating properties or additional functions according to requirements. Preferably, the outer fabric layer 110 is a fabric layer comprising polyester fibers, nylon fibers, or natural fibers, such as wool, cotton, or T/C blended yarns.

Figure 2:
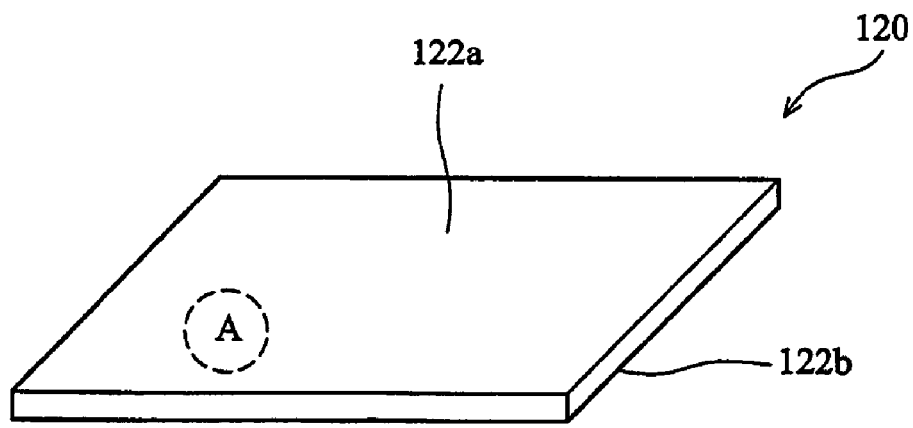
FIG. 2 is a schematic diagram of a hydrophobic membrane in FIG. 1.
Figure 3:
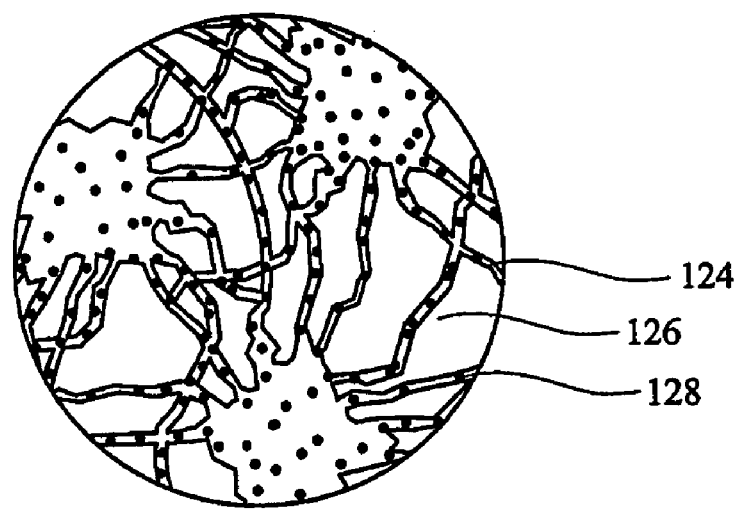
FIG. 3 is a locally enlarged view of the hydrophobic membrane in FIG. 2.

FIG. 2 is a schematic diagram of the hydrophobic membrane 120 in FIG. 1. FIG. 3 is a locally enlarged diagram of an area "A" enclosed by a dotted line in FIG. 2. As shown in FIG. 2 and FIG. 3, the hydrophobic membrane 120 with a top surface 122a and a bottom surface 122b comprises a plurality of tangled polymer fibers 124, a plurality of pores 126 among the polymer fibers 124, and a plurality of adhesive powders 128 distributed on the polymer fibers 124 on the top surface 122a and the bottom surface 122b. Thus, the outer fabric layer 110 and the inner fabric layer 130 can be bonded by the adhesive powders 128 to the top surface 122a and the bottom surface 122b of the hydrophobic membrane 120 respectively.

Each pore 126 has an irregular shape and a size about $1/20000$ of liquid water droplets and 700 times that of water vapor. Thus, liquid water is prevented from while air and water vapor are allowed to escape. Note that the grain size of each adhesive powder 128 is small enough to remain the pores 126 unobstructed. Thus, the adhesive powder 128 can securely bond the outer fabric layer 110 and inner fabric layer 130 without reducing humidity transmission of the hydrophobic membrane 120. Preferably, the hydrophobic membrane 120 comprises a PTFE (polyterafluoroethylene) film and the polymer fibers 124 are PTFE fibers, but are not limited thereto. The grain size of adhesive powder 128 is about 50 to 500 nm.

The inner fabric layer 130 is formed of a hydrophilic material bonded on the bottom surface 122b of the hydrophobic membrane 130 by adhesive powders 128. Preferably, the inner fabric layer 130 comprises improved polyester fibers with negative ion groups. The inner fabric layer 130 can be formed of other materials, such as cotton, wool, felt, synthetic fibers, or a combination thereof.

Furthermore, in one embodiment of the invention, the inner fabric layer 130 is formed of a hydrophilic material with enhanced hydrophilicity and rewetting properties, such as aliphatic polyamide or polyester polymers with appropriate hydrophilic add-on agents or coatings. Preferably, the inner fabric layer 130 comprises AKWATEKR polyester fibers produced by Comfortable Technologies, Inc. The properties and fabrication method of AKWATEKR polyester fibers is shown in U.S. Pat. No. 5,408,012. In this embodiment, the inner fabric layer 130 has high hydrophlicity, rewetting, and thermal regulative properties. It can provide a high water absorption ability to remove water or perspiration from a wearer rapidly, improve a water diffusion ability of the textile laminate 100, and make the wearer dry and comfortable.

Embodiments of the invention additionally provides a method of fabricating the aforementioned textile laminate 100. According to the method of this embodiment, the inner fabric layer 130 and the outer fabric layer 110 are first subjected to a pretreatment, such as dyeing, according to product requirements. A hydrophobic membrane 120 with a top surface 122a and a bottom surface 122b is then provided. The hydrophobic membrane 120 has a plurality of tangled polymer fibers 124 and a plurality of pores 126 among the polymer fibers 124. Pores 126 have irregular shapes and sizes about $1/20000$ of liquid water droplets and 700 times that of water vapor. Thus, the hydrophobic membrane 120 is permeable for water vapor but impermeable for liquid water.

Thereafter, a plurality of adhesive powders 128 are attached to the polymer fibers 124 on both surfaces 122a and 122b of the hydrophobic membrane 120. Preferably, the adhesive powders 128 are spread uniformly over the entirety of both surfaces. The adhesive powders 128, however, can be also disposed in a specific pattern according to product requirements.

Note that although the preparation of the adhesive powders with small grain sizes is not problematic for one skilled in the art, the adhesive powders tend to aggregate themselves together and are difficult to separate when the grain sizes of the adhesive powders 128 are extremely small, such as 50 to 500 nm. Put simply, if the adhesive powders 128 are directly attached to the hydrophobic membrane 120 without an additional dispersal process, clusters of the aggregated adhesive powders 128 will jam the pores 126 on the top and bottom surfaces 122a and 122b of the hydrophobic membrane 120.

To prevent this problem, a static force is utilized to disperse the adhesive powders 128 and uniformly attach them on both surfaces of the hydrophobic membrane 120. Accordingly, static charges with a first type are applied to the adhesive powders 128 and static charges of a second type are applied to the polymer fibers 124 on the top surface 122a and the bottom surface 122b of the hydrophobic membrane 120. As a result, the aggregated adhesive powders 128 are separated from each other due to the repellant force and attached to the top surface 122a and the bottom surface 122b of the hydrophobic membrane 120 due to the attracting force. In addition, since the grain size of each adhesive powder 128 is small enough in comparison with the size of the polymer fibers 124 and the pores 126, the pores 126 remain unobstructed after the adhesive powders 128 are attached to the hydrophobic membrane 120.

The outer fabric layer 110 and the inner fabric layer 130 then sandwich the top surface 122a and the bottom surface 122b of the hydrophobic membrane by the adhesive powders 128 on the both surfaces of the hydrophobic membrane 120.

Figure 4:
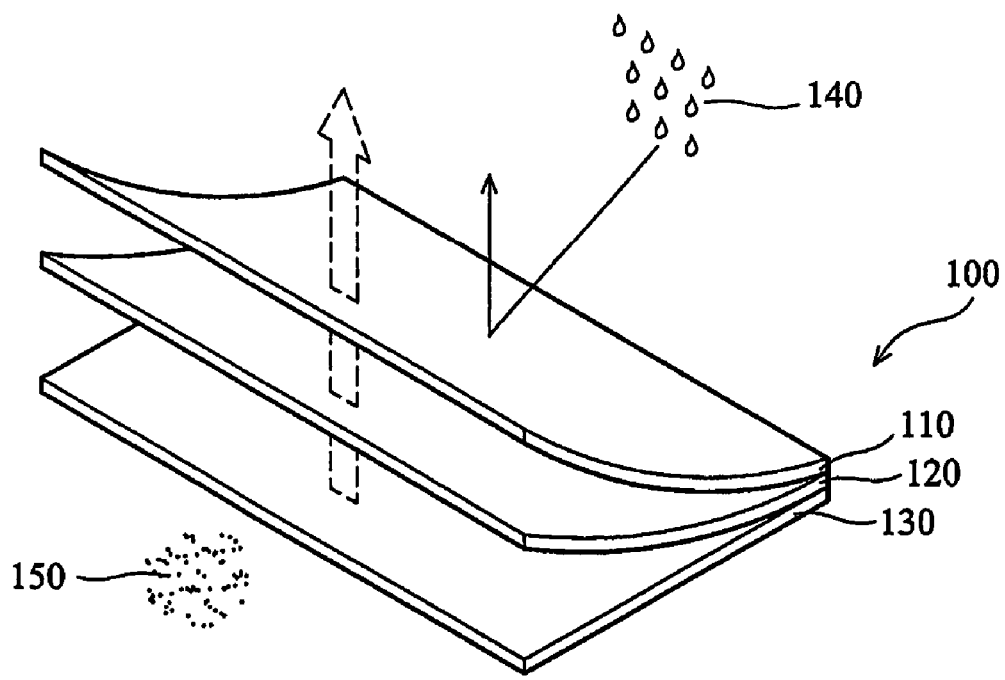
FIG. 4 is a schematic diagram of the waterproof and breathable mechanism of textile laminate.

FIG. 4 is a schematic diagram of the waterproof and breathable mechanism of the textile laminate 100 of an embodiment of the invention. As shown in FIG. 4, due to the waterproof characteristics of the hydrophobic membrane 120, liquid water 140 penetrating from the upper side of textile laminate 100 will be blocked by the outer fabric layer 110 and the hydrophobic membrane 120 and thereby preventing permeation of the textile laminate 100.

Conversely, due to the high hydrophilic and rewetting ability of the inner fabric layer 130, the humidity or water 150 on the inner fabric layer 130 is absorbed rapidly by the inner fabric layer 130 and then evaporated upward through the hydrophobic membrane 120. In addition, due to a presence of the inner fabric layer 130 with a high diffusion rate, generated perspiration is absorbed from a wearer's body in a very short time, making the wearer dry and comfortable. The evaporating rate through the hydrophobic membrane 120 can be further enhanced, leading to make a wearer more dry and comfortable. In this case, the waterproof textile laminate is not only waterproof, but also has high rewetting ability since the inner fabric layer 130 can absorb water or perspiration from the body of a wearer and assists in evaporation through the breathable waterproof layer.

A test sample according to an embodiment of the invention is tested in China Textile Institute. Table 1 shows the diffusion ability and an evaporation rate of the test sample. Table 2 shows the moisture picking ability. Table 3 shows the water resistance hydrostatic pressure and moisture permeability. According to the testing result of China Textile Institute, the moisture permeability of the sample of the textile laminate 100 is over 10000 g/m²-24 hr and the water resistant ability based on the water pressure method is over 10000 mm. It shows a great waterproof ability and an excellent breathable ability. In addition, the dry effect, diffusion ability, and moisture picking ability tests show high water absorption ability of the invention. It means generated perspiration can be absorbed from a wearer's body in a very short time, making the wearer dry and comfortable.

TABLE 1

| Test Items | Test Results | Testing Methods |
|---|---|---|
| Water Resistance Hydrostatic Pressure (mm) | Over 10000 | JIS L1092-1992 5.1.2B |
| Moisture Permeability (g/m²-24 hr) | 10016 | JIS L1099-1993 A-1 (CaCl$_2$) 40° C. * 90% RH |

TABLE 2

| Testing Item | Testing Results | | | | | | Testing Method |
|---|---|---|---|---|---|---|---|
| Diffusion Area (mm²) | 5 sec 951 | 10 sec 1568 | 20 sec 2464 | 30 sec 2659 | 60 sec 2784 | 90 sec 2798 | Diffusion ability method of China Textile Institute |
| Remained Water Ratio (%) | 10 min 71.4 | 20 min 46.0 | 40 min 1.3 | 60 min 0.3 | 80 min 0.2 | 100 min 0.1 | Drying effect method of China Textile Institute |

TABLE 3

| Testing Item | Testing Results | Testing Methods |
|---|---|---|
| Moisture Picking Ratio (%) | 21.15 | Moisture picking ability method of China Textile Institute |

Figure 5:
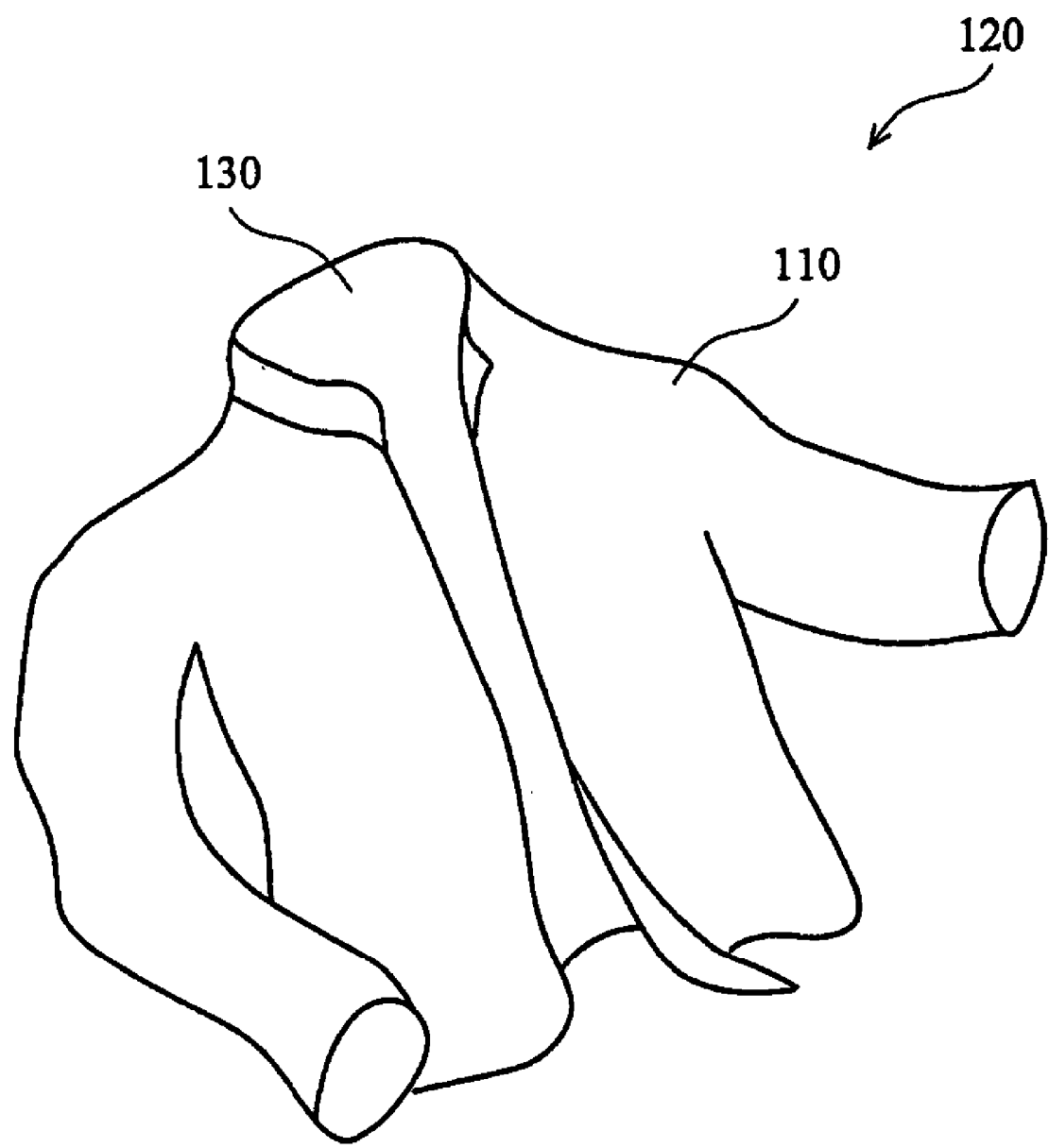
FIG. 5 is a schematic diagram of a garment fabricated according to an embodiment of the invention.

An embodiment of the present invention further provides a garment comprising the aforementioned textile laminate. FIG. 5 is a schematic diagram of a garment 200 comprising the textile laminate 100. For clarity, the garment manufacturing method is omitted herein as it is well-known for those skilled in the art and not directly related to the invention.

As shown in FIG. 5, the outer fabric layer 110 of the textile laminate 100 is located on an outer side of the garment 200 and the inner fabric layer 130 of the textile laminate 100 is located on an inner side of the garment 200 adjacent to the wearer. Thus, it is more comfortable for the wearer since the perspiration generated from the wearer can be rapidly absorbed by the high hydrophilic inner fabric layer 130 and evaporated through the hydrophobic membrane 120 and the outer fabric layer 130. Additionally, the liquid water from the environment, such as rain or snow, cannot pass through the garment 200 to the wearer's body due to the waterproof ability of the textile laminate 100.

The invention provides a new textile laminate structure and a method of fabricating the same. According to the invention, the method of combining the outer fabric layer 110, the hydrophobic membrane 120, and the inner fabric layer 130 does not reduce the humidity transmission of the hydrophobic membrane 120 substantially. Furthermore, the invention provides a laminate structure having a hydrophobic membrane, and an inner fabric layer with high hydrophilicity and rewetting properties. Thus, the humidity transmission of the textile laminate can be improved significantly, leading to a more comfortable garment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of fabricating a textile laminate comprising:
   providing a hydrophobic membrane with a top surface and a bottom surface, the hydrophobic membrane having a plurality of tangled polymer fibers and a plurality of pores among the polymer fibers, the pores being water vapor permeable and liquid water impermeable;
   attaching a plurality of adhesive powders to the polymer fibers on the top surface and the bottom surface by utilizing static to spread the adhesive powders, the grain size of each adhesive powders being small enough to remain the pores without obstructing the permeability;
   adhering an outer fabric layer onto the top surface of the hydrophobic membrane by the adhesive powder dispersed thereon; and
   adhering an inner fabric layer onto the bottom surface of the hydrophobic membrane by the adhesive powder dispersed thereon;
   wherein the grain size of the adhesive powder has a diameter of about 50 to 500 nm.

2. The method as claimed in claim 1 wherein the hydrophobic membrane comprises a PTFE (polyterafluoroethylene) film and the polymer fibers are PTFE fibers.

3. The method as claimed in claim 1 wherein the outer fabric layer comprises synthetic or natural fibers or blends thereof.

4. The method as claimed in claim 1 wherein the inner fabric layer comprises cotton, wool, felt, synthetic fibers, or a combination thereof.

5. The method as claimed in claim 1 wherein the inner fabric layer comprises a hydrophilic material wit high bydrophilicity and rewetting properties.

6. The method as claimed in claim 5 wherein the inner fabric layer comprises aliphatic polyamide or polyester polymers with hydrophilic add-on agents or coatings to provide a rapid water absorption ability and improve a water diffusion ability of the textile laminate.

7. The method as claimed in claim 1 wherein the adhesive powder is uniformly spread on the polymer fibers on the top surface and the bottom surface of the hydrophobic membrane.

8. The method as claimed in claim 1 wherein the adhesive powders are spread in a specific pattern on the polymer fibers on the top surface and the bottom surface of the hydrophobic membrane.

* * * * *